May 25, 1926.  
C. R. MABEE  
1,585,931  
FEED PROCESSING APPARATUS  
Filed June 20, 1925  
2 Sheets-Sheet 2
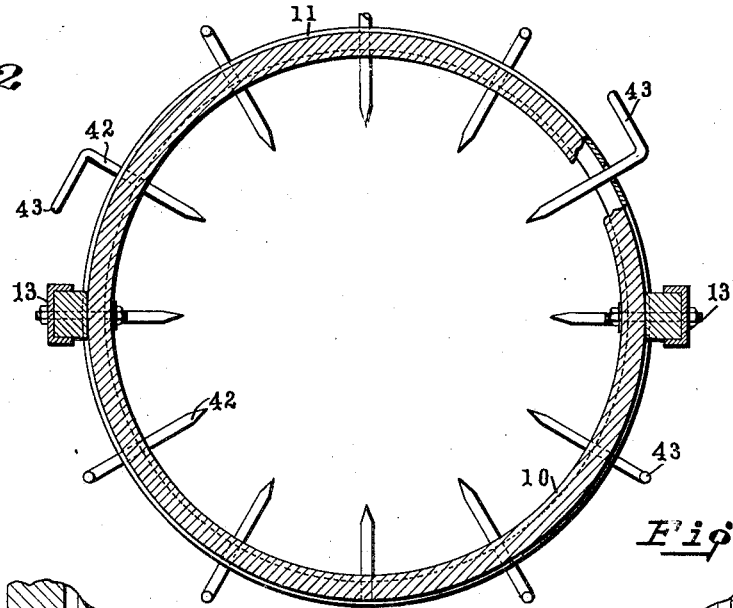
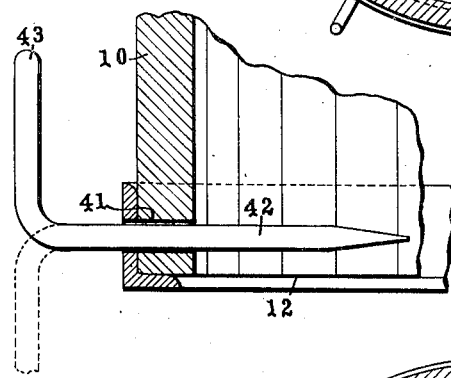
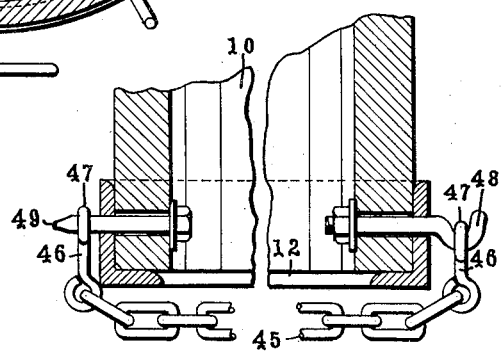
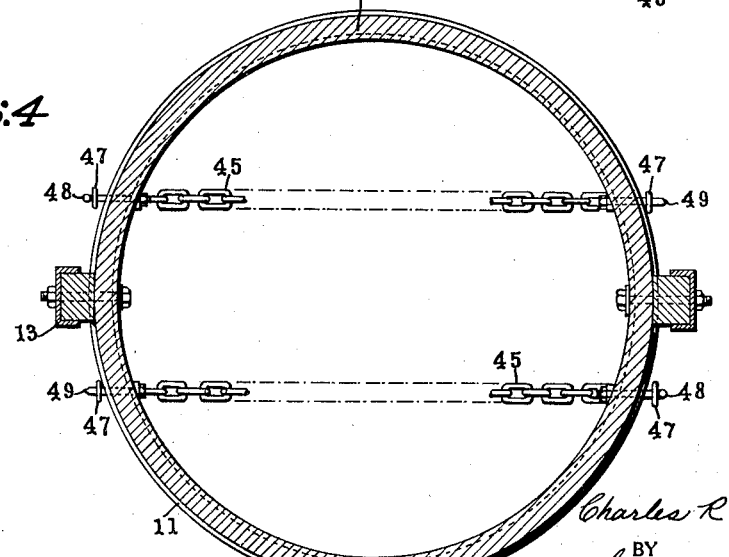
INVENTOR  
Charles R. Mabee  
BY  
Mayer, Warfield & Watson  
ATTORNEYS Patented May 25, 1926.

1,585,931

UNITED STATES PATENT OFFICE.

CHARLES R. MABEE, OF BUFFALO, NEW YORK, ASSIGNOR TO MABEE PATENTS CORPORATION, OF DOVER, DELAWARE, A CORPORATION OF DELAWARE.

FEED PROCESSING APPARATUS.

Application filed June 20, 1925. Serial No. 38,439.

This invention relates to fermentation apparatus, and more particularly to apparatus adapted for the preparation of feeds for cattle by fermentation processes.

This invention has for its object generally to provide an apparatus of the character indicated, which is efficient and economical, and is readily installed and operated.

A more specific object of this invention is to provide an improved arrangement of a fermenter, together with auxiliary apparatus whereby the feed processing may be carried on continuously or completed by the batch; also to provide a convenient arrangement whereby the processed feed may be conveniently withdrawn as desired.

Other objects of the invention will in part be obvious and will in part appear hereinafter.

The invention accordingly comprises the features of construction, combination of elements, and arrangement of parts, which will be exemplified in the constructions hereinafter set forth and the scope of the application of which will be indicated in the claims.

For a fuller understanding of the nature and objects of the invention reference should be had to the following detailed description taken in connection with the accompanying drawing, in which:

Fig. 2 is a transverse section near the bottom of the fermenter, showing means for withdrawing the processed feed as desired;

Fig. 3 is a fragmentary view, on a somewhat enlarged scale, showing more in detail the means at the lower end of the fermenter for permitting the withdrawal of the processed feed;

Figs. 4 and 5 are views similar to Figs. 2 and 3 showing a modified arrangement of means for thus withdrawing the processed feed.

Figure 1:
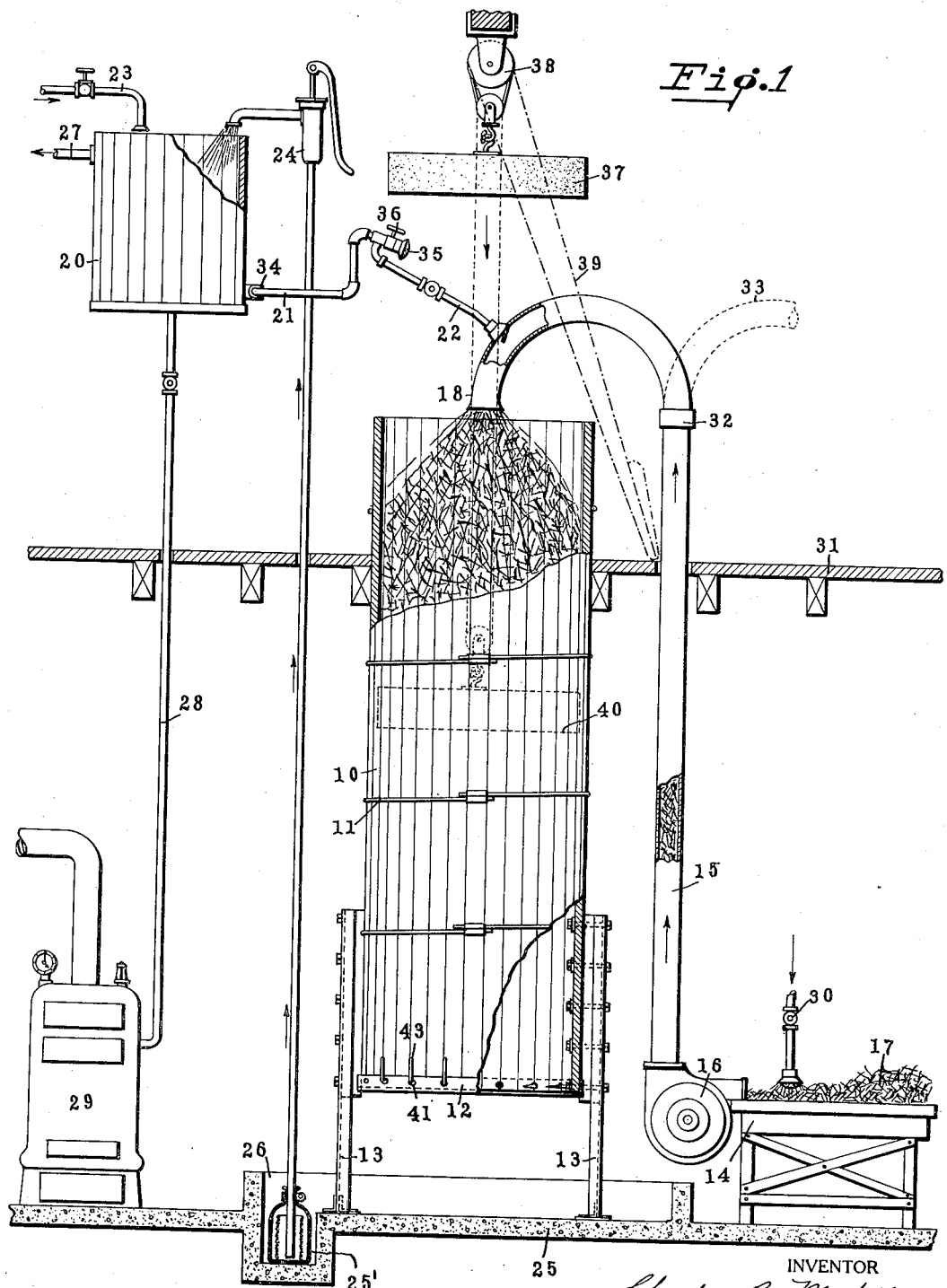
Fig. 1 is a view mainly in elevation, but having parts broken away, showing a fermenter, together with auxiliary apparatus arranged in accordance with the invention.

Referring now to the drawing, 10 denotes a fermenter which, as shown, preferably comprises a cylinder open at both ends and made of wooden staves of the character generally used in the construction of vats and the like. The staves are held in place by bands or hoops, as shown at 11. The lower end of this cylinder is disposed in a supporting annulus 12, the whole being secured to and supported by a plurality of upright standards 13 arranged so as to support the lower end of the cylinder at the same distance above the floor 25 of the barn, feed house, or other place where the feed is being processed for the feeding of cattle and the like. A food chopping table 14 is preferably disposed adjacent the fermenter, which is provided with an elevator-column 15 having a fan blower or other suitable means 16 for drawing in the cut or comminuted feed and farm roughage shown generally at 17 which is to be discharged through the downwardly-curved upper end 18 into the top of the fermenter.

In order to condition the comminuted feed and farm roughage for proper fermentation within the fermenter, a reservoir 20 is provided in which digestive or converting materials are contained in solution, suitable pipe connections being employed as shown at 21 for properly supplying the digestive materials to the comminuted feed and farm roughage. As shown, the pipe connections 21 lead from a point adjacent the bottom of the reservoir and have a detachable valved connection 22 leading to a suitable point in the downwardly-curved end 18.

The reservoir 20 is equipped for the proper conditioning of the digestive materials or agents and to this end has a valved water-supply connection 23 adapted to discharge into the upper end of the reservoir. A pump 24 is also provided for returning a certain portion of the digestive agents which have collected in the sump 25', which is provided in the floor 25 sufficiently close to catch the drip from the bottom of the fermenter. In order to prevent the drip from running away, the space immediately under the fermenter is preferably surrounded by a low wall 26. The reservoir is also provided with an overflow connection 27 and with a heating connection 28 for introducing live steam from the steam generator shown at 29, whereby the contents of the reservoir may be heated to any desired extent.

In order that the comminuted feed or roughage may be at least partially conditioned before entering the elevator-column 15, a valved pipe connection 30 terminating in a spraying nozzle is shown adjacent the top of the table which is adapted for moistening initially the comminuted material.

As the fermenter of this invention is generally installed in feed houses or barns which have mows for the storing of hay, straw, etc., it may be desirable at times to fill the fermenter directly from the mow. In the arrangement of the fermenter illustrated, the top of the fermenter is preferably made to extend through and slightly above the mow floor shown at 31. When filling the fermenter from the mow floor, the elevator-column 15 is not in use and consequently the downwardly curved upper end 18 is shown as provided with a swivelled connection at 32 whereby it may be turned aside when suitably disconnected from the pipe connection 22 and made to occupy the position shown in the dotted lines at 33. In order that the digestive or converting materials may be properly introduced into the fermenter when being filled from the mow floor, the pipe connection 21 is preferably a swivelled connection disposed in a nipple shown at 34 with which it communicates with the lower end of the reservoir 20. This enables the pipe connection 21 to be turned downwardly so that the nozzle 35 comes into a position closely adjacent the upper end of the fermenter so as to spray the digestive or converting materials into the fermenter while being filled when the valve 36 is opened.

The fermentation processes, for which the present fermenter is adapted, take place most favorably when subject to pressure. Consequently there is provided a pressure-applying weight preferably in the form of a concrete disc as shown at 37, which is suspended from a suitable pulley-block 38, the rope or chain connections indicated at 39 being adapted to lower the weight into the fermenter onto the top of the treated comminuted material. The weight when in such position is indicated in dotted lines at 40.

In order that the fermenter may have convenient means for withdrawing the processed feed in desired quantities and at the same time have what is in effect an open lower end for the fermentation processes here contemplated, it is provided with a plurality of spaced horizontal openings 41 which are formed through the outer wall of the ring 12 and the lower ends of the fermenter staves, as is more clearly shown in Fig. 3. Through each of these openings is introduced an elongated pin 42 preferably having an upturned outer end 43 which serves as a handle. These pins when in place project sufficiently toward the centre of the fermenter to afford adequate support for the fibres of the comminuted feed which become somewhat knitted together in the fermentation process. Any number of these pins may be withdrawn at will to release such portion of the processed feed which has reached the bottom of the fermenter as may be desired. When it has dropped to the floor 25, it may be readily removed for feeding purposes.

In Fig. 4 there is shown a modified arrangement of supporting means for the processed feed which has reached the bottom of the fermenter comprising a plurality of chains 45. These chains are not disposed along a diameter of the fermenter, but preferably along some convenient cord displaced from a diameter. Each chain has terminal links 46 formed with eyes 47 arranged to engage with supporting elements on the fermenter, for example, one link may engage with the hook shown at 48 on the right of Fig. 5, and the other with the end of the pin shown on the left at 49. Both the hook 48 and the pin 49 extend through horizontal openings in the lower end of the fermenter similar to the pins shown in Fig. 3. The projecting end of a pin 49 is preferably of such length that the eye of the terminal link 46 can be readily pried loose therefrom, thereby releasing its chain and permitting the removal of the bottom portion of the feed from one side of the fermenter. The feed supporting means provided in accordance with either of these forms is thus seen to have what may be referred as an "open" characteristic so that the fermenter itself is in effect open at both ends and is adapted for carrying out feed fermentation processes, such for example as is disclosed in my co-pending applications, Serial No. 437,308— filed Jan. 14, 1921, and Serial No. 38,565, filed June 20, 1925.

In the carrying-out of such process, suitable digestive or converting materials, as taught in the said copending applications, are properly mixed in reservoir 20, to which a certain proportion of the spent liquors of previous fermentation are preferably added through the instrumentality of the pump shown at 24. When the reservoir is charged, the fermenter may be filled with chopped feed and farm roughage as previously indicated. Where the process is operated in batches, a charge of the fermenter would, of course, be fully removed before recharging takes place. When it is desired to run the process continuously, the processed feed is removed from the bottom from time to time in quantities desired for feeding purposes until the fermenter has been sufficiently emptied, for example, one-third to two-thirds of its capacity, whereupon the fermenter is recharged to a desired height and the fermentation process continued as long as desired.

While the digestive or converting materials in reservoir 20 will as a rule comprise a mixture of suitable curing and nutritive ingredients, together with desired ferments, it is to be understood that the term "digestive or converting materials" is not to be so narrowly construed as to exclude the use solely of cold or tepid water as the sprayed material introduced into the fermenter along with the comminuted feed or farm roughage whereby the fermentation induced in the fermenter results from the natural ferments initially present in the feed or roughage.

Since certain changes may be made in the above construction and different embodiments of the invention could be made without departing from the scope thereof, it is intended that all matter contained in the above description or shown in the acompanying drawing shall be interpreted as illustrative and not in a limiting sense.

Having described my invention, what I claim as new and desire to secure by Letters Patent is:

1. In fermenting apparatus adapted for processing cattle feed and the like, the combination with a fermenter, having open ends, of a reservoir disposed adjacent the upper end and adapted to supply digestive materials thereto, and open feed supporting means at the lower end of said fermenter arranged for the withdrawing at will of desired quantities of processed material.

2. In fermenting apparatus adapted for processing cattle feed and the like, the combination with a fermenter, having open ends, of a reservoir arranged for supplying converting materials to said fermenter, means for supplying in comminuted form material to be processed at the upper end, and open feed supporting means at the lower end arranged for the withdrawing at will of desired quantities of processed material.

3. In fermenting apparatus adapted for processing cattle feed and the like, the combination with a fermenter, having open ends, of a reservoir adapted to supply converting material to the upper end thereof, means for introducing comminuted material to be fermented in conjunction with said reservoir, and a weight adapted to be introduced at will into the upper end of the fermenter whereby the fermentation process takes place under pressure.

4. In fermenting apparatus adapted for processing cattle feed and the like, the combination with a fermenter, having open ends, of a reservoir adapted to supply converting material to the upper end thereof, means for introducing comminuted material to be fermented in conjunction with said reservoir, a weight adapted to be introduced at will into the upper end of the fermenter, and open feed supporting means at the bottom of said fermenter adapted for the withdrawing at will of desired quantities of processed material.

5. In fermenting apparatus adapted for processing cattle feed and the like, the combination with fermenter having open ends, of means for introducing comminuted material into the upper end thereof, and open feed supporting means at the lower end for withdrawing at will desired quantities of processed material.

6. In fermenting apparatus adapted for processing cattle feed and the like, the combination with a fermenter having open ends, of pressure means adapted to be introduced at the upper end of said fermenter for applying pressure to the fermenting material within the same, and means at the lower end of said fermenter adapted to permit the withdrawal of desired quantities of fermented material at will.

7. In fermenting apparatus adapted for processing cattle feed and the like, the combination with a fermenter having open ends, of an elevator-column adapted to supply comminuted material to the upper end of said fermenter, and means disposed in operative conjunction with said elevator-column adapted to introduce converting materials in conjunction therewith.

8. In fermenting apparatus adapted for processing cattle feed and the like, the combination with a fermenter having open ends, of an elevator-column for introducing comminuted material to be processed at the upper end, and a movable weight adapted to be introduced at will into the upper end, whereby said fermentation process may take place under pressure.

9. In fermenting apparatus adapted for processing cattle feed and the like, the combination with a fermenter having open ends, of means for introducing digestive material into the upper end of said fermenter in conjunction with the charge of comminuted materials to be fermented, and a movable weight adapted to be lowered into the upper end of said fermenter whereby the process of fermentation may take place under pressure.

10. In fermenting apparatus adapted for processing cattle feed and the like, the combination with an open-ended fermenter, of means disposed about the periphery of the lower end arranged for supporting individual portions of the processed feed in the lower end of the fermenter, said means comprising independently removable elements whereby desired portions of the processed feed may be removed at will.

In testimony whereof I affix my signature.

CHARLES R. MABEE.